United States Patent
Hayashida et al.

(10) Patent No.: US 10,866,912 B2
(45) Date of Patent: Dec. 15, 2020

(54) INTEGRATED HETEROGENEOUS SOLID STATE STORAGE DRIVE

(71) Applicant: Toshiba Memory Corporation, Tokyo (JP)

(72) Inventors: Mark Hayashida, San Ramon, CA (US); Yaron Klein, Raanana (IL)

(73) Assignee: Toshiba Memory Corporation, Tokyo (JP)

(*) Notice: Subject to any disclaimer, the term of this patent is extended or adjusted under 35 U.S.C. 154(b) by 0 days.

(21) Appl. No.: 15/456,138

(22) Filed: Mar. 10, 2017

(65) Prior Publication Data

US 2018/0260135 A1    Sep. 13, 2018

(51) Int. Cl.
*G06F 12/06* (2006.01)
*G06F 13/16* (2006.01)
*G06F 13/42* (2006.01)
*G06F 3/06* (2006.01)

(52) U.S. Cl.
CPC ........ *G06F 13/1673* (2013.01); *G06F 3/0604* (2013.01); *G06F 3/0631* (2013.01); *G06F 3/0688* (2013.01); *G06F 13/4282* (2013.01)

(58) Field of Classification Search
USPC .................................................. 711/203, 209
See application file for complete search history.

(56) References Cited

U.S. PATENT DOCUMENTS

| | | | |
|---|---|---|---|
| 6,957,294 B1 | 10/2005 | Saunders et al. | |
| 7,509,420 B2 | 3/2009 | Moulton et al. | |
| 8,126,939 B2 | 2/2012 | Raciborski et al. | |
| 8,132,168 B2 | 3/2012 | Wires et al. | |
| 8,301,809 B2 | 10/2012 | Liu et al. | |
| 8,468,299 B2 | 6/2013 | O'Rourke et al. | |
| 8,595,431 B2 | 11/2013 | Yamagami | |
| 8,760,922 B2 | 6/2014 | Lassa | |
| 8,769,241 B2 | 7/2014 | Chiang et al. | |
| 8,775,868 B2 | 7/2014 | Colgrove et al. | |
| 8,903,848 B1 | 12/2014 | Bahrami et al. | |
| 9,047,090 B2 | 6/2015 | Kottilingal et al. | |
| 9,082,512 B1 | 7/2015 | Davis et al. | |

(Continued)

OTHER PUBLICATIONS

John Harker, "Tiered Storage Design Guide", Best Practices for Cost-effective Designs, Hitachi Data Systems, pp. 1-21, Sep. 2010.

(Continued)

*Primary Examiner* — Ilwoo Park
(74) *Attorney, Agent, or Firm* — White & Case LLP (57) ABSTRACT

In one embodiment, a heterogeneous integrated solid state drive includes a plurality of solid state memory devices including at least one solid state memory device of a first type and at least one solid state memory device of a second type, a controller coupled to each of the plurality of solid state memory devices and an interface coupled to the controller. The controller is configured to receive at least one user-defined memory parameter and to create at least one namespace satisfying the at least one user-defined memory parameter in at least one of the plurality of solid state memory devices. In one embodiment, the at least one user-defined memory parameter is one of a group consisting of a capacity, a quality of service level, an assured number of I/O operations per second, a bandwidth, a latency, and an endurance.

14 Claims, 6 Drawing Sheets

(56) References Cited

U.S. PATENT DOCUMENTS

| | | |
|---|---|---|
| 9,128,820 B1 | 9/2015 | Malina |
| 9,146,851 B2 | 9/2015 | Pittelko |
| 9,164,888 B2 | 10/2015 | Borchers et al. |
| 9,213,603 B2 | 12/2015 | Tiziani et al. |
| 2003/0051021 A1 | 3/2003 | Hirschfeld et al. |
| 2011/0035543 A1 | 2/2011 | Yang |
| 2011/0106802 A1* | 5/2011 | Pinkney ............ G06F 17/30085 707/737 |
| 2012/0158669 A1* | 6/2012 | Morsi ............... G06F 17/30085 707/689 |
| 2014/0207741 A1* | 7/2014 | Morsi ................. G06F 16/125 707/689 |
| 2015/0012570 A1 | 1/2015 | Le et al. |
| 2015/0052176 A1 | 2/2015 | Akaike et al. |
| 2015/0378613 A1 | 12/2015 | Koseki |
| 2016/0259597 A1 | 9/2016 | Worley et al. |
| 2017/0024137 A1* | 1/2017 | Kanno ................. G06F 3/0604 |
| 2017/0123707 A1* | 5/2017 | Carey ................ G06F 13/4068 |
| 2020/0004429 A1* | 1/2020 | Schmisseur .......... G06F 3/0631 |

OTHER PUBLICATIONS

Yongseok Oh et al., "Hybrid Solid State Drives for Improved Performance and Enhanced Lifetime," pp. 1-5, Apr. 16, 2013.

\* cited by examiner

FIG. 4

INTEGRATED HETEROGENEOUS SOLID STATE STORAGE DRIVE

FIELD OF THE INVENTION

The present invention generally relates to solid state storage technologies and more particularly to managing an integrated heterogeneous solid state storage drive.

BACKGROUND OF THE INVENTION

Non-volatile memory (NVM) is a type of computer memory that retains stored information even after power cycling—powering a device off and then on again. In contrast, volatile memory is a type of computer memory that requires power to maintain the stored information—when the power is off or interrupted, the stored data is lost. A traditional type of non-volatile memory is a hard disk drive (HDD), which stores and accesses data using one or more rotating disks (platters) coated with magnetic material.

Another type of storage memory is a solid state drive (SSD), which differs from a HDD in that digital data is stored and retrieved using electronic circuits, without any moving mechanical parts. SSDs can be used based on both volatile memory, such as dynamic random-access memory (DRAM) or static random access memory (SRAM), or non-volatile memory, such as NAND flash memory. The standard NAND flash memory can be Single Level Cell (SLC) or Multi Level Cell (MLC), including enterprise MLC (eMLC), Triple Level Cell (TLC) and Quadratic Level Cell (QLC). While the higher data density of MLC memory reduces the cost per unit of storage, SLC memory has faster write speeds, lower power consumption and higher cell endurance.

While early SSDs retain legacy HDD form factors and connectivity, modern SSDs break away from these limitations. Without the constraints of platter mechanics inherent in HDDs, modern SSDs have superior mechanical ruggedness and can come in much smaller form factors than the standard 1.8 inch, 2.5 inch and 3.5 inch for HDDs, such as M.2. M.2 is a specification for internally mounted expansion cards and associated connectors, with flexible physical specification that allows different module widths and lengths, as well as more advanced interfacing features, such as Peripheral Component Interconnect Express (PCI Express or PCIe).

Due to its low latency and high throughput, PCIe connectivity is becoming more popular and has led to more efficient access protocols and storage stacks. One example is Non-Volatile Memory Express (NVMe), a logical device communications interface or protocol specifically developed for SSDs that provides parallel, multi-queue application program interface (API) over PCIe, for a local storage device directly connected to a computer through a PCIe bus, or over a switch fabric, for a remote storage device that is connected via a communications network, such as the Ethernet, using remote direct memory access (RDMA). NVMe uses the concept of a "namespace" to enable an SSD to divide the storage capacity into multiple separately addressable units, identified by a namespace id (NSID). Storage locations within the namespace are addressable by a logical block address (LBA). Thus, any storage location within an NVMe device is identified by the combination of NSID and LBA.

Despite these advances in solid state storage technologies, existing computer systems and enterprise servers still heavily rely on legacy HDD infrastructure. Adapters that make solid state drives compatible with HDD infrastructure have been developed. One type of solid state drive adapter in the form factor of a HDD is disclosed in U.S. Patent Application Publication 2016/0259754, filed on Oct. 20, 2015, and U.S. Patent Application Publication 2016/0259597, filed on Nov. 24, 2015, which are hereby incorporated by reference. These publications disclose a solid state drive adapter that includes multiple solid state drives, an interface section, and a drive connector. This adapter, however, does not support managing the storage capacity within the solid state drives according to parameters defined by users. What is needed, therefore, is an improved technique for adapting solid state drives with smaller form factors, such as M.2 SSDs, and heterogeneous formats and densities (e.g., SLC, MLC, and TLC) to be used with computing systems and servers designed for HDD infrastructures and for managing solid state drives integrated into an HDD infrastructure.

BRIEF DESCRIPTION OF THE INVENTION

In one embodiment, a heterogeneous integrated solid state drive includes a plurality of solid state memory devices including at least one solid state memory device of a first type and at least one solid state memory device of a second type, a controller coupled to each of the plurality of solid state memory devices and an interface coupled to the controller. The controller is configured to receive at least one user-defined memory parameter and to create at least one namespace satisfying the at least one user-defined memory parameter in at least one of the plurality of solid state memory devices. In one embodiment, the at least one user-defined memory parameter is one of a group consisting of a capacity, a quality of service level, an assured number of I/O operations per second, a bandwidth, a latency, and an endurance. In one embodiment, the controller is configured to create a namespace corresponding to a first set of memory addresses in the at least one solid state memory device of the first type and a second set of memory addresses in the at least one solid state memory device of the second type. In one embodiment, the interface is an Ethernet network interface card configured to communicate using an NVMe over Fabric protocol. In another embodiment the interface is a PCIe bus interface. In one embodiment the controller is configured to autonomously move data within the at least one namespace to implement a quality of service level.

In one embodiment, a method includes determining at least one property of at least one solid state memory device of a first type coupled to a controller, determining at least one property of at least one solid state memory device of a second type different from the first type coupled to the controller, receiving at least one user-defined memory parameter, and creating at least one namespace satisfying the at least one user-defined memory parameter in at least one of the plurality of solid state memory devices coupled to the controller. In one embodiment, the at least one user-defined memory parameter is one of a group consisting of a capacity, a quality of service level, an assured number of I/O operations per second, a bandwidth, a latency, and an endurance. In one embodiment, the method further includes the controller autonomously moving data within the at least one namespace to implement a quality of service level.

DETAILED DESCRIPTION OF THE INVENTION

Figure 1A:
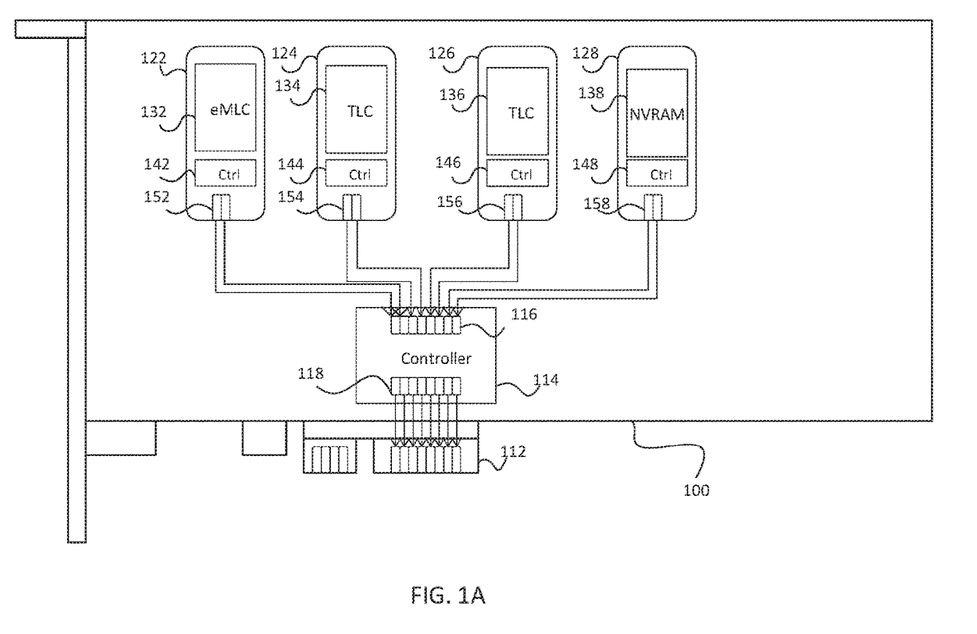
FIG. 1A is a block diagram of an integrated heterogeneous solid state drive including a PCIe interface, according to one embodiment of the invention.

FIG. 1A is a block diagram of an integrated heterogeneous solid state drive (or integrated drive) 100, according to one embodiment of the invention. In one embodiment, integrated drive 100 has a form factor of a standard storage disk. For example, integrated device 100 may have the form factor of a 2.5" hard disk drive, a 3.5" hard disk drive, a 2.5" NVMe device, or a Half-Height, Half-Length (HHHL) PCIe adapter flash device. As shown in FIG. 1A, integrated drive 100 includes, but is not limited to, a plurality of heterogeneous NVM devices 122, 124, 126, and 128 communicatively coupled to a controller 114. NVM device 122 includes an eMLC NAND flash memory device 132, a memory controller 142, and a connector 152. NVM device 124 includes a TLC NAND flash memory device 134, a memory controller 144, and a connector 154. NVM device 126 includes a TLC NAND flash memory device 136, a memory controller 146, and a connector 156. While integrated drive 100 is shown having eMLC and TLC NAND memory devices, NAND memory devices of other density types, for example SLC, MLC, QLC, 3D-NAND, and the like, are within the scope of the invention. NVM device 128 includes an NVRAM memory device 138, a memory controller 148, and a connector 158. In one embodiment, NVRAM device 138 is magnetoresistive RAM (MRAM) memory device. Other types of NVRAM devices, for example resistive RAM (ReRam), are within the scope of the invention.

In the FIG. 1A embodiment, each of NVM devices 122, 124, 126, and 128 have an M.2 form factor and each of connectors 152, 154, 156, and 158 is a two-lane PCIe connector. Other form factors of NVM devices, for example mSATA, eMMC, and the like, and other connectors and access protocols, for example mSATA, NVMe, and the like, are within the scope of the invention. While FIG. 1A shows an embodiment of integrated drive 100 including four NVM devices 122, 124, 126, and 128, integrated drive 100 is not limited to four NVM devices and may include any number of NVM devices.

Controller 114 is coupled to each of NVM devices 122, 124, 126, and 128 through a PCIe connector 116, and is coupled to a connector 112 of integrated drive 100 through a PCIe connector 118. In other embodiments, controller 114 may include a plurality of heterogeneous hardware interfaces, for example, memory bus, PCIe bus, SATA bus, SAS bus, and the like, to connect with NVM devices 122, 124, 126, and 128. In the FIG. 1A embodiment, connector 112 is a PCIe connector that can be coupled to a PCIe bus (not shown) of an enterprise server or other computing system using, for example, an NVMe protocol. Other hardware connection types (for example SAS) and other protocols (for example SCSI) are within the scope of the invention. In one embodiment, connector 112 includes a data path and a management path that share the same hardware interface; in another embodiment the data path and management path use different hardware interfaces. In one embodiment the data path and management path use the same protocol, for example NVEMe for data and NVMe-MI for management; in another embodiment the data path and management path uses different protocols, for example NVMe for data and Baseboard Management Controller (BMC) for management. The management path allows a manager, such as a user, to communicate with controller 114 to manage the operation of integrated drive 100, for example, through a graphical user interface (GUI) or a command line interface (CLI), or management software such as BMC, OpenStack, or the like.

Controller 114 includes firmware configured to control storage and retrieval/sending of data to and from each of NVM devices 122, 124, 126, and 128. Controller 114 is also configured to create and expose namespaces to entities external to integrated drive 100. A namespace is a defined set of logical address locations that are mapped to logical address locations in one or more of NVM devices 122, 124, 126, and 128. For example, in one embodiment a particular namespace may be mapped to logical addresses in NVM device 124. In another embodiment, a particular namespace may be mapped to logical addresses in NVM device 122 and NVM device 126. Controller 114 is further configured to provide other functionalities such as tiering, implementing quality of service (QoS), and implementing service level agreements (SLAs), which are described further in conjunction with FIGS. 2A-2D.

Figure 1B:
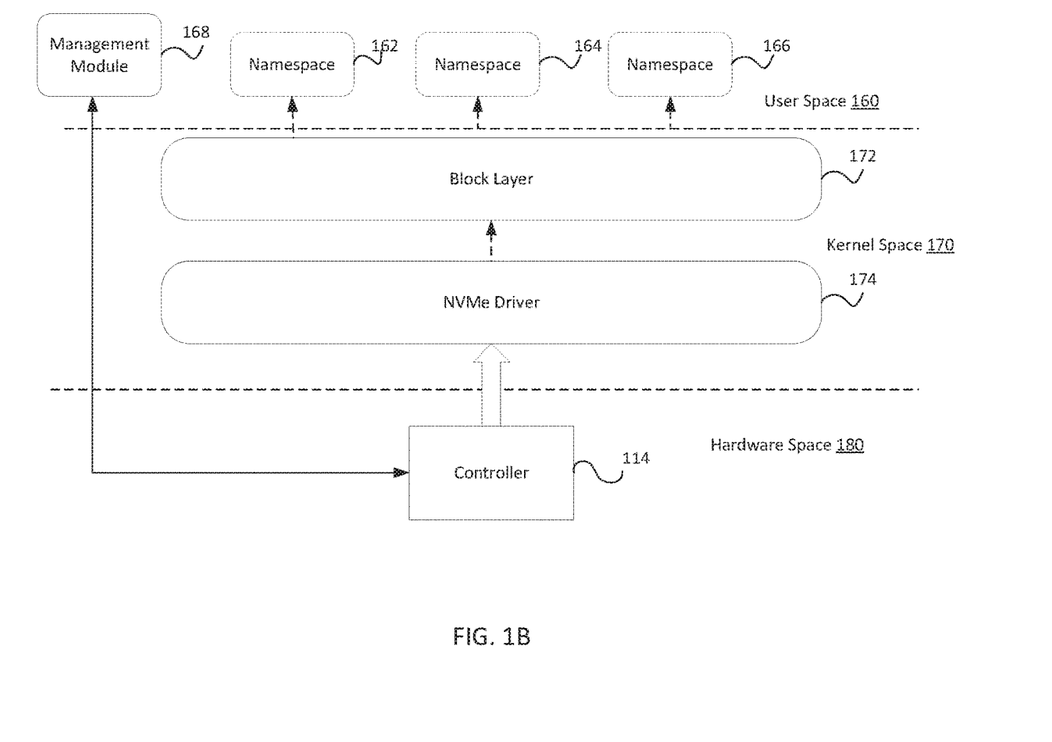
FIG. 1B is a diagram of a host's view of namespaces provided by the integrated heterogeneous solid state drive of FIG. 1A, according to one embodiment of the invention.

FIG. 1B is a diagram of a host's view of namespaces provided by integrated heterogeneous solid state drive 100 of FIG. 1A, according to one embodiment of the invention. Controller 114 in a hardware space 180 presents namespaces 162, 164, and 166 in a user space 160 through an NVMe driver 174 and a block layer 172 in a kernel space 170. In user space 160 each of namespaces 162, 164, and 166 appears as a separate memory with its own parameters. For example, namespace 162 may appear in user space 160 as a block device having a certain capacity and certain latency. A management module 168 in user space 160 enables a user (through a GUI or CLI) or management software to interact with controller 114 to create namespaces 162, 163, and 166 and to define their parameters such as capacity, performance, and endurance. Controller 114 manages NVM devices 122, 124, 126, and 128 (shown in FIG. 1A) to satisfy the parameters of namespaces 162, 164, and 166.

In another embodiment, controller 114 is configured to expose NVM devices 122, 124, 126, and 128 to user space 160 transparently. In other words, a host computer coupled to integrated drive 100 would "see" each of NVM devices 122, 124, 126, and 128 as if those devices were located at the host computer. For example, in this embodiment, a namespace presented in user space 160 corresponding to NVM device 122 would have logical addresses that are mapped directly to the logical address of NVM device 122.

Figure 2A:
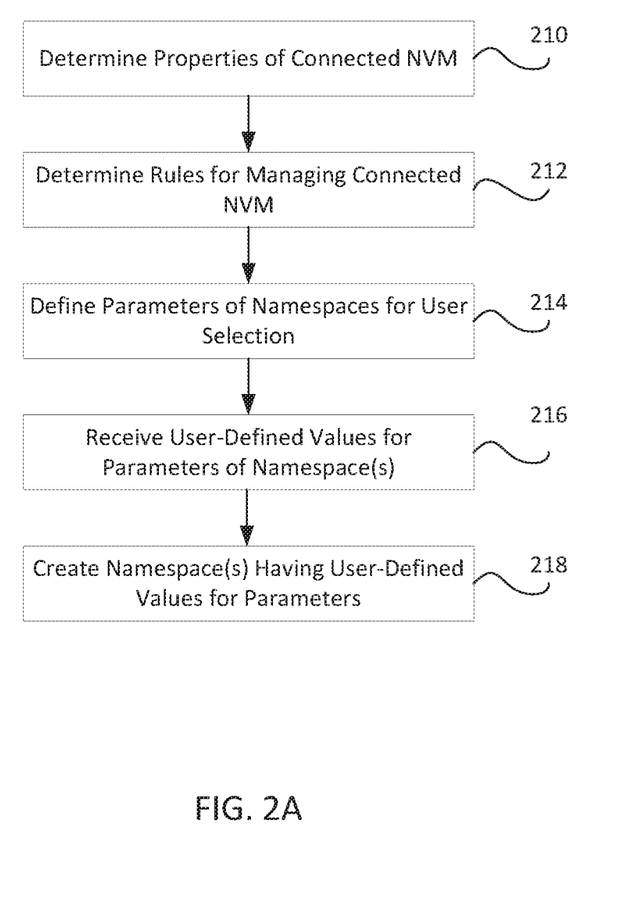
FIG. 2A is a flowchart of method steps for creating namespaces in an integrated heterogeneous sold solid device having user-defined values for parameters, according to one embodiment of the invention.

FIG. 2A is a flowchart of method steps for creating namespaces in an integrated heterogeneous sold solid drive having user-defined values for parameters, according to one embodiment of the invention. In step 210, upon startup (boot up) a controller for an integrated heterogeneous solid state drive, such as controller 114 of integrated drive 100 of FIG. 1A, discovers any NVM devices coupled to it and determines properties of those NVM devices. In other embodiments, the functions of the controller are performed by one or more of the memory controllers of the NVM devices and/or a host computer. The properties will include, for example, memory type (e.g., eMLC NAND, TLC NAND, or NVRAM), capacity (e.g., 500 Gigabytes, 1K Gigabytes), interface type (e.g., PCIe, SATA), and protocol (e.g., NVMe, iSCSI). In step 212, the controller determines rules for managing the connected NVM devices based on the properties of the NVM devices (management rules). For example, in one embodiment, if the NVM devices include TLC NAND, eMLC NAND, and NVRAM devices, the controller uses at least the following heuristics to create the rules for managing the memory devices: frequently accessed ("hot") data should not be stored in a TLC memory, infrequently accessed ("cold") data should be stored in a TLC memory, frequently accessed data should be stored in an NVRAM memory or an SLC memory, byte addressable (i.e., less than a page) data should be buffered in an NVRAM memory, "cold" data stored in an eMLC memory should be moved to a TLC memory, data requiring high speed and low latency write performance should be stored in an SLC memory in preference to a MLC memory, and heavily read data may be replicated on a plurality of TLC NAND devices to increase parallelism. In creating the management rules for the memory devices, the controller also considers various characteristics of the memory devices including but not limited to latency (e.g., nanoseconds for NVRAM, tens of microseconds for NAND), endurance (e.g., one thousand program/erase cycles (P/E) for TLC, fifty thousand P/E for eMLC, and no limit for NVRAM), capacity versus cost (e.g., large for TLC, medium for eMLC, small for NVRAM), accessibility (e.g., block protocol for NAND, memory semantic for NVRAM), and addressable width (e.g. byte addressable for NVRAM, page addressable for NAND).

In step 214, the controller defines parameters of namespaces that users will be able to select. In one embodiment, the controller-defined parameters of namespaces include capacity, QoS level, and SLA. In one embodiment, a QoS level requires that a given operation be completed within a specified time limit. In one embodiment, SLA parameters include performance (e.g., assured number of I/O operations per second (IOPS), bandwidth, and latency), endurance (e.g. disk write per day), and cost. In step 216, the controller receives user-defined values for parameters of one or more namespaces to be created. For example, in one embodiment, the controller receives definitions for a namespace's capacity and SLA parameters. In step 218, the controller creates the one or more namespaces having the received user-defined values for parameters.

Figure 2B:
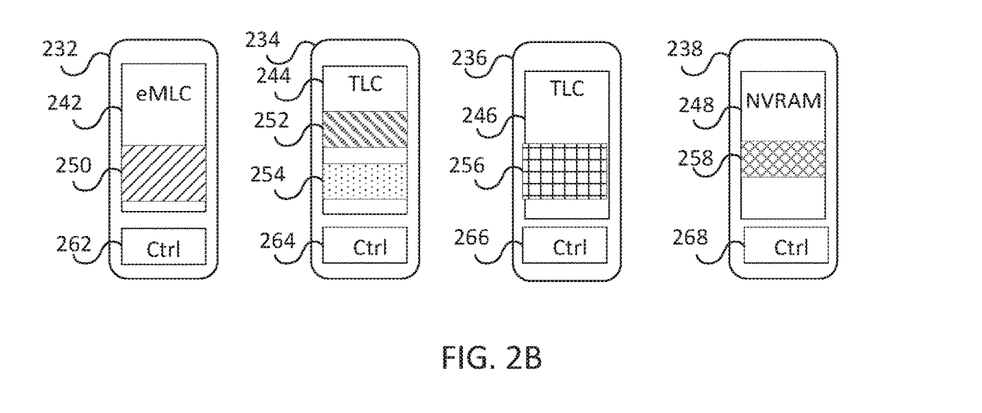
FIG. 2B is a diagram of namespaces in an integrated heterogeneous solid state drive, according to one embodiment of the invention.

FIG. 2B is a diagram of namespaces in an integrated heterogeneous solid state drive, according to one embodiment of the invention. Here, namespaces 250, 252, 254, 256, and 258 were created to satisfy user definitions for capacity and performance. Namespace 250 associated with eMLC memory 242 of NVM device 232 has a capacity as defined by the user and is mapped to NVM device 232 because, for example, the performance of an eMLC NAND-type memory satisfies the defined performance (e.g., medium latency and IOPS). Namespaces 252 and 254 associated with a TLC memory 244 of NVM device 234 and namespace 256 associated with a TLC memory 246 of NVM device 236 have capacities as defined by the user and are mapped to NVM devices 234 and 236, respectively, because, for example, the performance of a TLC NAND-type memory satisfies the defined performance (e.g., higher latency but lower cost). Namespace 258 associated with a NVRAM memory 248 in NVM device 238 has a capacity as defined by a user and is mapped to NVM device 238 because, for example, the performance of a NVRAM-type memory satisfies the defined performance (e.g., low latency and frequent read operations).

Figure 2C:
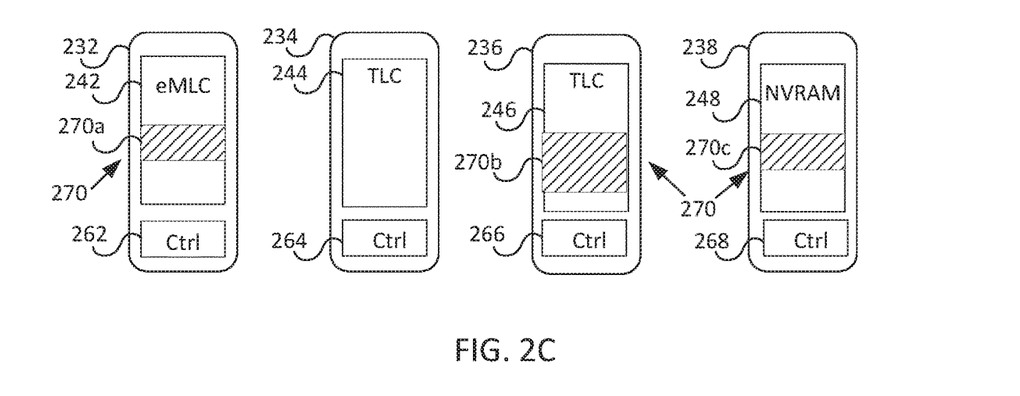
FIG. 2C is a diagram of a distributed namespace in an integrated heterogeneous solid state drive, according to one embodiment of the invention.

FIG. 2C is a diagram of a distributed namespace in an integrated heterogeneous solid state drive, according to one embodiment of the invention. In one embodiment, the controller, such as controller 114 of FIG. 1A, dynamically allocates memory to namespaces to satisfy a user's SLA requirements. Such dynamic allocation of memory includes but is not limited to techniques such as auto-tiering (e.g., autonomously mapping "cold" data onto lower performance media and mapping "hot" data onto higher performance media), creating a write buffer with low latency, and using high-endurance media such as NVRAM. In the FIG. 2C embodiment, a namespace 270 is dynamically mapped among NVM devices 232, 236, and 238. The controller dynamically stores "cold" data on high capacity, low performance physical devices (e.g., namespace portion 270b in TLC device 246), stores "hot" data on higher performance physical devices (e.g., namespace portion 270a in eMLC device 242) and stores very low latency, frequently accessed data on very low latency, high performance physical devices (e.g., namespace portion 270c in NVRAM device 248).

Figure 2D:
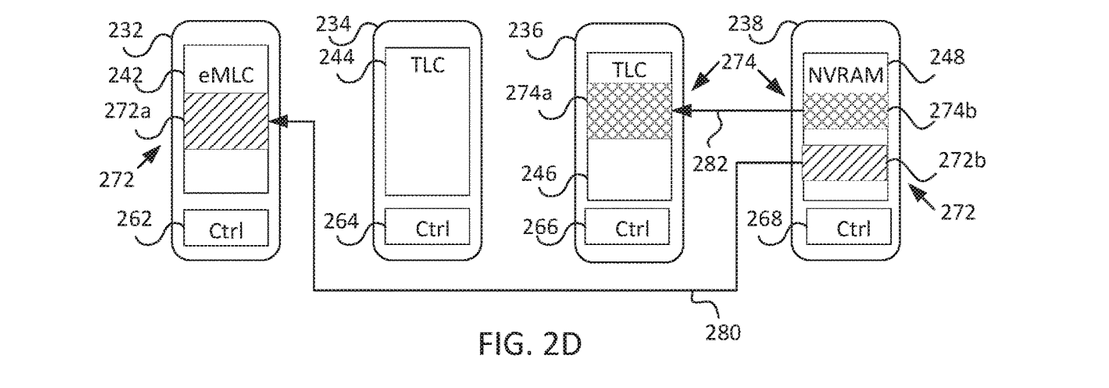
FIG. 2D is a diagram of namespaces including write buffers in an integrated heterogeneous solid state drive, according to one embodiment of the invention.

FIG. 2D is a diagram of namespaces including write buffers in an integrated heterogeneous solid state drive, according to one embodiment of the invention. In the FIG. 2D embodiment, a namespace 272, which includes a namespace portion 272a and a write buffer 272b, and a namespace 274, which includes a namespace portion 274a and a write buffer 274b, have been defined to have low latency write operations. The controller created namespaces 272 and 274 to include write buffers 272b and 274b, respectively, to satisfy the defined parameter of low latency write operations. After data has been received from outside the integrated device and written to write buffer 272b, the controller autonomously moves the data to namespace portion 272a in eMLC device 242 (as shown by arrow 280). Namespace 274, as viewed by a user or host, has low latency yet also satisfies a parameter of high capacity by the controller autonomously moving data from write buffer 274b to namespace portion 274a in NVM device 236 (as shown by arrow 282).

Figure 3:
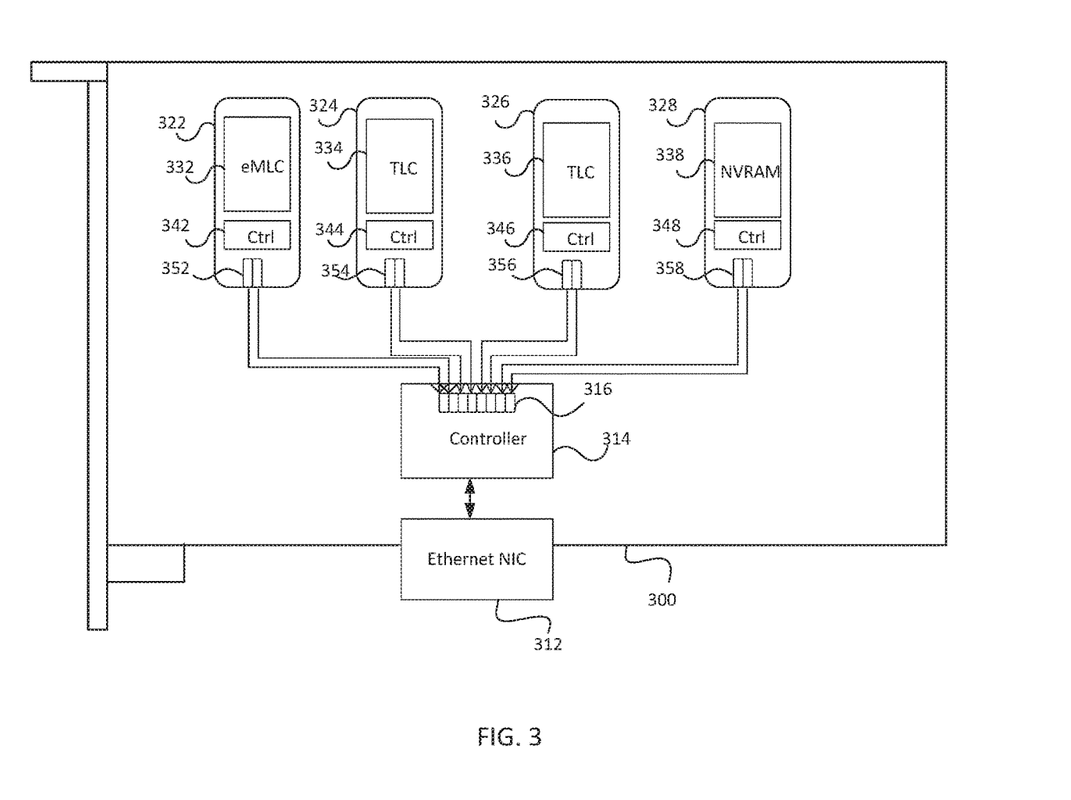
FIG. 3 is a block diagram of an integrated heterogeneous solid state drive including an Ethernet network interface card, according to one embodiment of the invention.

FIG. 3 is a block diagram of an integrated heterogeneous solid state drive 300 including an Ethernet network interface card, according to one embodiment of the invention. In one embodiment, integrated drive 300 has a form factor of a standard storage disk. For example, integrated device 300 may have the form factor of a 2.5" hard disk drive, a 3.5" hard disk drive, a 2.5" NVMe device, or a Half-Height, Half-Length (HHHL) flash device. As shown in FIG. 3, integrated drive 300 includes, but is not limited to, a plurality of heterogeneous NVM devices 322, 324, 326, and 328 communicatively coupled to a controller 314. NVM device 322 includes an eMLC NAND flash memory device 332, a memory controller 342, and a connector 352. NVM device 324 includes a TLC NAND flash memory device 334, a memory controller 344, and a connector 354. NVM device 326 includes a TLC NAND flash memory device 336, a memory controller 346, and a connector 356. While integrated drive 300 is shown having eMLC and TLC NAND memory devices, NAND memory devices of other density types, for example SLC, MLC, QLC, 3D-NAND, and the like, are within the scope of the invention. NVM device 328 includes an NVRAM memory device 338, a memory controller 348, and a connector 358. In one embodiment, NVRAM device 338 is magnetoresistive RAM (MRAM) memory device. Other types of NVRAM devices, for example ReRam, are within the scope of the invention.

In the FIG. 3 embodiment, each of NVM devices 322, 324, 326, and 328 have an M.2 form factor and each of connectors 352, 354, 356, and 358 is a two-lane PCIe connector. Other form factors of NVM devices, for example mSATA, eMMC, and the like, and other connectors and access protocols, for example mSATA, NVMe, and the like, are within the scope of the invention. While FIG. 3 shows an embodiment of integrated drive 300 including four NVM devices 322, 324, 326, and 328, integrated drive 300 is not limited to four NVM devices and may include any number of NVM devices.

Controller 314 is coupled to each of NVM devices 322, 324, 326, and 328 through a PCIe connector 316, and is further coupled to an Ethernet network interface card (NIC) 312 of integrated drive 300. In other embodiments, controller 314 may include a plurality of heterogeneous hardware interfaces, for example, memory bus, PCIe bus, SATA bus, SAS bus, and the like, to connect with NVM devices 322, 324, 326, and 328. In the FIG. 3 embodiment, Ethernet NIC 312 can be coupled to an Ethernet network and can communicate with an enterprise server or other computing system using an NVMe over Fabric protocol. Other Ethernet-based protocols, for example iSCSI and Fibre Channel over Ethernet, are within the scope of the invention. In one embodiment, Ethernet NIC 312 is configured to receive and respond to remote direct memory access (RDMA) read and write commands.

Controller 314 includes firmware configured to control storage and retrieval of data to and from each of NVM devices 322, 324, 326, and 328. Controller 314 is also configured to create and expose namespaces to entities external to integrated drive 300. Controller 314 is further configured to provide other functionalities such as tiering, implementing quality of service (QoS), and implementing service level agreements (SLAs), as set forth above in conjunction with FIGS. 2A-2D.

In one embodiment, when integrated drive 300 receives a RDMA write command from a host over a network, the write command is parsed by controller 314. Controller 314 may store the data in NVM device 328, as NVRAM device 338 may have low latency, and then send an acknowledgement back to the host over the network. In such a case the latency of performing the write command is determined by the latency of storing data in NVRAM device 338. At some later time, controller 314 may move the data to a lower tier, for example to TLC device 334 of NVM device 324, in accordance with its management rules.

Figure 4:
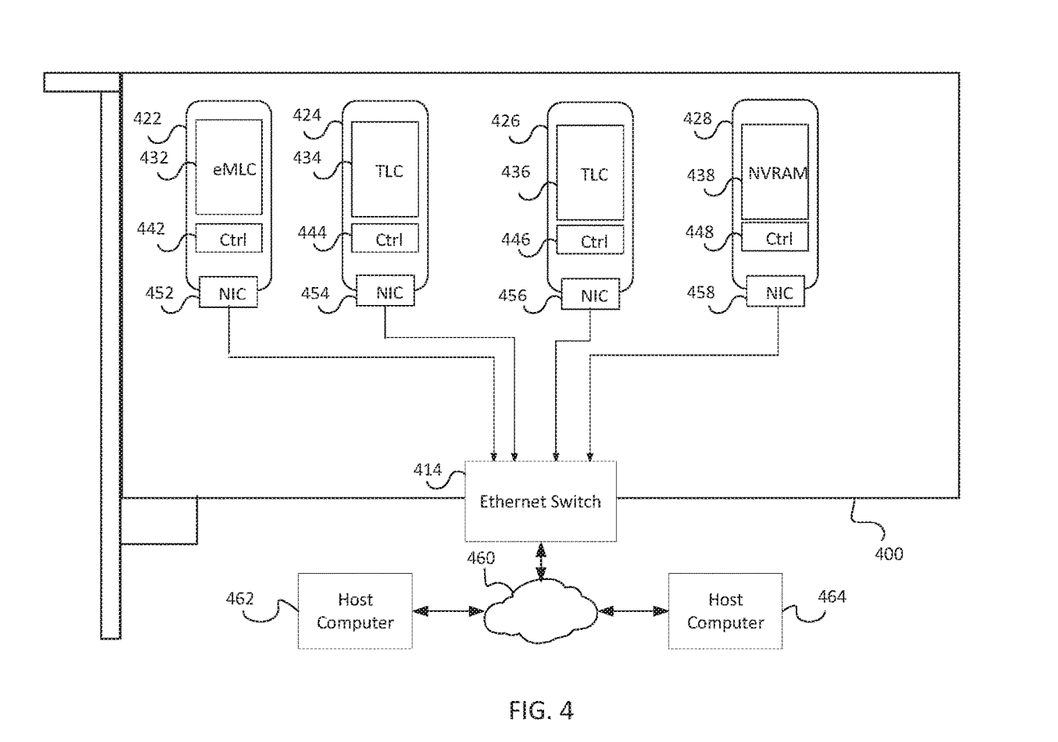
FIG. 4 is a block diagram of an integrated heterogeneous solid state drive including an Ethernet switch, according to one embodiment of the invention.

FIG. 4 is a block diagram of an integrated heterogeneous solid state drive 400 including an Ethernet switch, according to one embodiment of the invention. In one embodiment, integrated drive 400 has a form factor of a standard storage disk. For example, integrated drive 400 may have the form factor of a 2.5" hard disk drive, a 3.5" hard disk drive, a 2.5" NVMe device, or a Half-Height, Half-Length (HHHL) flash device. As shown in FIG. 4, integrated drive 400 includes, but is not limited to, a plurality of heterogeneous NVM devices 422, 424, 426, and 428 communicatively coupled to an Ethernet switch 414. NVM device 422 includes an eMLC NAND flash memory device 432, a memory controller 442, and a network interface card (NIC) 452. NVM device 424 includes a TLC NAND flash memory device 434, a memory controller 444, and a network interface card 454. NVM device 426 includes a TLC NAND flash memory device 436, a memory controller 446, and a network interface card 456. While integrated drive 400 is shown having eMLC and TLC NAND memory devices, NAND memory devices of other density types, for example SLC, MLC, QLC, 3D-NAND, and the like, are within the scope of the invention. NVM device 428 includes an NVRAM memory device 438, a memory controller 448, and a network interface card 458. In one embodiment, NVRAM device 438 is magnetoresistive RAM (MRAM) memory device. Other types of NVRAM devices, for example ReRam, are within the scope of the invention.

In the FIG. 4 embodiment, each of NVM devices 422, 424, 426, and 428 have an M.2 form factor. Other form factors of NVM devices, for example mSATA, eMMC, and the like, are within the scope of the invention. While FIG. 4 shows an embodiment of integrated drive 400 including four NVM devices 422, 424, 426, and 428, integrated drive 400 is not limited to four NVM devices and may include any number of NVM devices.

Ethernet switch 414 is coupled to each of NICs 452, 454, 456, and 458 and is further coupled to host computers 462 and 464 via a network 460. In the FIG. 4 embodiment, Ethernet switch 414 communicates with each of NICs 452, 454, 456, and 458 and host computers 462 and 464 using an NVMe over Fabric protocol. Other Ethernet-based protocols, for example iSCSI and Fibre Channel over Ethernet, are within the scope of the invention. In one embodiment, each of NICs 452, 454, 456, and 458 is configured to receive and respond to remote direct memory access (RDMA) read and write commands.

Creation and exposure of namespaces to entities external to integrated drive 400 is distributed across memory controllers 442, 444, 446, and 448 and/or one or more of host computers 462 and 464. For example, in one embodiment host computer 462 sends a RDMA write command to NVM device 428 and NIC 458 writes the data to low-latency NVRAM device 438. Thus the data is written to integrated drive 400 with low latency. At some later time host computer 462 sends a RDMA move command to NVM device 424 to move the data from NVM device 428 to NVM device 424. The move command includes an identification of the source device, start address, and length of the data to be moved. NVM device 424 sends an RDMA read command to NVM device 428, which responds by sending the requested data to NVM device 424. NVM device 424 writes the requested data to TLC device 434, sends an acknowledgement to host computer 462, and sends a trim command to NVM device 428 to evacuate the request data from its original location. In another example, host computer 462 sends an RDMA copy command to NVM device 424 to copy data from NVM device 428 to NVM device 424. NVM device 424 performs the same functions as in performing a move operation except that no trim command is sent to NVM device 428. According to one embodiment, mapping of the namespaces resides in a one of host computers 462 or 464. According to another embodiment, mapping of the namespaces are distributed across host computers 462 and 464. In one embodiment, memory controllers 442, 444, 446, and 448 and/or one or more of host computers 462 and 464 also provide other functionalities such as tiering, implementing quality of service (QoS), and implementing service level agreements (SLAs), as set forth above in conjunction with FIGS. 2A-2D.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, a machine may comprise a single instance or a plurality of machines, such plurality possibly encompassing multiple types of machines which together provide the indicated function. The machine types described in various embodiments are not meant to limit the possible types of machines that may be used in embodiments of aspects of the present invention, and other machines that may accomplish similar tasks may be implemented as well. Similarly, principles according to the present invention, and methods and systems that embody them, could be applied to other examples, which, even if not specifically described here in detail, would nevertheless be within the scope of the present invention.

What is claimed is:

1. A heterogeneous integrated solid state drive comprising:
    a plurality of solid state memory devices disposed in the heterogeneous integrated solid state drive, the plurality of solid state memory devices comprising at least one solid state memory device of a first type and at least one solid state memory device of a second type different from the first type;
    a controller disposed in the heterogeneous integrated solid state drive, the controller coupled to each of the plurality of solid state memory devices; and
    an interface disposed in the heterogeneous integrated solid state drive, the interface coupled to the controller, the interface configured to communicate with a device external to the heterogeneous integrated solid state drive,
    wherein
        the controller is configured to:
            receive at least one user-defined memory parameter, the user-defined memory parameter being user-selected from at least one controller-defined parameter in a plurality of controller-defined parameters,
            create at least one namespace satisfying the at least one user-defined memory parameter in at least one of the plurality of solid state memory devices, and
            create a first namespace in the at least one namespace corresponding to a first set of memory addresses in the at least one solid state memory device of the first type and a second set of memory addresses in the at least one solid state memory device of the second type, and
        the at least one solid state memory device of a first type is a NAND memory device and the at least one solid state memory device of a second type is a NVRAM device.

2. The heterogeneous integrated solid state drive of claim 1, wherein the interface is an Ethernet network interface card or a PCIe bus interface.

3. The heterogeneous integrated solid state drive of claim 1, wherein the interface is configured to communicate using a NVMe over Fabric protocol.

4. The heterogeneous integrated solid state drive of claim 1, wherein the at least one solid state memory device of a first type is a NAND memory device of a first type and the at least one solid state memory device of a second type is a NAND memory device of a second type different from the first type.

5. The heterogeneous integrated solid state drive of claim 1, wherein the at least one solid state memory device of the first type is a NVRAM device and controller is configured to utilize the first set of memory addresses in the at least one solid state memory device of the first type as a write buffer.

6. The heterogeneous integrated solid state drive of claim 1, wherein the at least one user-defined memory parameter is one of a group consisting of a capacity, a quality of service level, an assured number of I/O operations per second, a bandwidth, a latency, and an endurance.

7. The heterogeneous integrated solid state drive of claim 1, wherein the at least one user-defined memory parameter is a quality of service level.

8. The heterogeneous integrated solid state drive of claim 7, wherein the controller is further configured to autonomously move data within the at least one namespace to implement a quality of service level.

9. A method comprising:
    determining at least one property of at least one solid state memory device of a first type coupled to a controller, wherein the controller and at least one solid state memory device are disposed in a heterogeneous integrated solid state device;
    determining at least one property of at least one solid state memory device of a second type different from the first type coupled to the controller, wherein the at least one solid state memory device of the second type are disposed in the heterogeneous integrated solid state drive;
    receiving at least one user-defined memory parameter, wherein the user-defined memory parameter is user-selected from at least one controller-defined parameter in a plurality of controller-defined parameters;
    creating at least one namespace satisfying the at least one user-defined memory parameter in at least one of the plurality of solid state memory devices coupled to the controller, and
    creating a first namespace in the at least one namespace corresponding to a first set of memory addresses in the at least one solid state memory device of the first type and a second set of memory addresses in the at least one solid state memory device of the second type,
    wherein the at least one solid state memory device of a first type is a NAND memory device and the at least one solid state memory device of a second type is a NVRAM memory device.

10. The method of claim 9, wherein the at least one solid state memory device of a first type is a NAND memory device of a first type and the at least one solid state memory device of a second type is a NAND memory device of a second type different from the first type.

11. The method of claim 9, wherein the at least one solid state memory device of the first type is a NVRAM device and creating the namespace includes defining the first set of memory addresses in the at least one solid state memory device of the first type as a write buffer.

12. The method of claim 9, wherein the at least one user-defined memory parameter is one of a group consisting of a capacity, a quality of service level, an assured number of I/O operations per second, a bandwidth, a latency, and an endurance.

13. The method of claim 9, wherein the at least one user-defined memory parameter is a quality of service level.

14. The method of claim 13, further comprising the controller autonomously moving data within the at least one namespace to implement a quality of service level.

\* \* \* \* \*